United States Patent [19]
Robledo

[11] Patent Number: 5,035,155
[45] Date of Patent: Jul. 30, 1991

[54] DEVICE FOR PREVENTING CONTAMINATION OF TRANSMISSION FLUID

[76] Inventor: Ismael L. Robledo, 7855 Ivywood, Commerce City, Colo. 80022

[21] Appl. No.: 402,062

[22] Filed: Sep. 1, 1989

[51] Int. Cl.⁵ .................. F16H 57/04; B61F 15/22
[52] U.S. Cl. ...................... 74/467; 74/606 R; 277/67; 464/7; 184/6.12; 184/106
[58] Field of Search .................. 74/606 R, 467; 184/6.12, 6.27, 106; 464/7, 16, 170; 384/473, 474; 277/67, 63

[56] References Cited
U.S. PATENT DOCUMENTS

| | | | |
|---|---|---|---|
| 1,001,687 | 8/1911 | Richards | 464/7 |
| 1,760,463 | 5/1930 | Abenanti | 277/67 |
| 2,304,255 | 1/1941 | Huber | 184/106 |
| 2,438,245 | 3/1948 | Gregg | 60/52 |
| 2,618,351 | 11/1952 | Giacosa | 180/69.1 |
| 2,891,808 | 6/1989 | Richardson | 277/67 |
| 4,157,045 | 6/1979 | Suzuki | 74/467 |
| 4,187,817 | 2/1980 | Wilson et al. | 123/139 |
| 4,271,860 | 6/1981 | Jeppsson | 137/240 |
| 4,300,589 | 11/1981 | Wold | 137/312 |
| 4,359,909 | 11/1982 | Sogo | 74/467 |
| 4,389,984 | 6/1983 | Destrampe | 123/196 |
| 4,495,830 | 1/1985 | Yasue | 74/467 |
| 4,498,353 | 2/1985 | Kitade | 74/467 |
| 4,499,969 | 2/1985 | Toombs | 184/106 |
| 4,841,797 | 6/1989 | Cerrington et al. | 74/467 |

Primary Examiner—Allan D. Herrmann
Assistant Examiner—Winnie Yip
Attorney, Agent, or Firm—Dorr, Carson, Sloan & Peterson

[57] ABSTRACT

Automotive engine leaking from a crankcase seal in a gear train housing can be collected and returned to the crankcase oil pan before it contaminates the transmission fluid by means of a device which serves to collect the leaked oil in a reservoir which is isolated from the transmission fluid and which is continuously drained.

23 Claims, 5 Drawing Sheets

DEVICE FOR PREVENTING CONTAMINATION OF TRANSMISSION FLUID

BACKGROUND OF THE INVENTION

1. Field of The Invention.

This invention relates generally to the field of automotive transmissions and more particularly to devices for preventing contamination of transmission fluid by lubricating oils from automotive engines such as diesel or gasoline engines.

2. Brief Description of The Prior Art.

Complex mechanical systems such as automotive power trains typically employ several different kinds of fluids, e.g., fuels, lubricating oils, hydraulic fluids, transmission fluids, coolants, etc. As a general rule such fluids are contained in a specific sub-system or location and any contact between such fluids is usually regarded as an undesirable contamination of one fluid by another. Consequently, many devices and systems have been developed to prevent such fluid contamination.

Art known to the applicant which is generally concerned with collecting and/or redirecting fluids, e.g., oil, hydraulic fluids, coolants, etc. leaked from mechanical devices can be summarized as follows:

U.S. Pat. No. 2,618,351 teaches an oil sump pan which is attached to the lower surface of a crankcase. The lower surface of the sump pan has a corrugated surface to increase the oil cooling surface area. The pan has a simple outlet hole for the oil collected in the sump pan.

U.S. Pat. No. 4,499,969 teaches an oil salvage block assembly which collects lubricating oil at a point beneath the travel of a reciprocally moving block and transfers the oil, via a flexible tube, to a collection point.

U.S. Pat. No. 2,304,255 teaches an oil pan baffle device which directs oil down from a release passage to a point beneath an oil reservoir level (as opposed to being directed into the oil reservoir) and thereby decreasing undesirable foaming in the reservoir which would otherwise occur if the incoming oil stream were merely splashed into the top surface of the oil reservoir.

U.S. Pat. No. 2,438,245 teaches a system for returning leakage oil to a main fluid supply. The oil is collected in a sump and transferred to a collection tank whose liquid level operates a float valve. When the float valve is open a venturi or jet educator sucks the oil from a storage tank and returns it to a circulating oil system.

U.S. Pat. No. 4,187,817 discloses a system to modulate fuel flow to each cylinder of an internal combustion engine based upon, in part, increased air pressure within the engine's intake manifold in order to achieve more effective fuel/air ratios. The system is based upon diaphragm operation of a fuel flow modulating valve which is responsive to engine intake manifold pressure which, in turn, is detected via an air line connecting a diaphragm operator with the intake manifold. The system also has a drain line for returning any fuel which may leak into the diaphragm operator due to leakage in a seal.

U.S. Pat. No. 4,271,860 teaches a valve system wherein any fluid leakage around seals between a sleeve and a stem and between the sleeve and housing flows downward into an underlying chamber and then through drain openings to the atmosphere.

U.S. Pat. No. 4,300,589 teaches a hydraulic brake fluid drainage collection device for the wheel cylinder of drum brakes. The device is comprised of a catch basin mounted under the cylinder and a tube which extends from the bottom of the catch basin to a point outside of the system.

U.S. Pat. No. 4,389,984 teaches a device for supplying turbocharger impeller bearings with a coolant, e.g., crankcase lubricating oil. The device includes a valve seat which is closed during engine operation by a valve extending from the downstream side of the piston in order to return any coolant leaking downstream of the piston to the oil crankcase.

All the references cited above involve the use of fluid catching and/or fluid diverting means, but none is specifically adapted to the task of collecting oil leaking from a crankshaft seal in the gear train housing which usually separates an automotive engine from its transmission. This is an ongoing problem because crankshaft seals in such gear train housings eventually wear down and/or they wear a depression in the crankshaft which rotates in such seals. In either case the seal starts to leak oil from the crankcase side of the housing to the transmission side of said housing. Under present procedures, such leaks are usually dealt with by replacing the seals and this in turn usually involves pulling the engine and/or the transmission.

Leakage of this type usually starts to occur before the engine and/or transmission otherwise needs to be overhauled, repaired or replaced. For example, the crankshaft seals in many diesel powered buses often start to leak after about 80,000 miles. If engine oil is allowed to continue to leak into the transmission side of the housing and hence into the transmission fluid, the transmission soon begins to suffer in efficiency (and in terms of increased mechanical wear) and begins to "slip", that is to rotate without delivering power to the drive wheels. Typically, initial leaks of this type are remedied by use of so-called "speedy sleeves" which are in effect sleeves which are placed on the crankshaft. That is to say that they are mounted, as collars, around the crankshaft. So mounted, they rotate in a new oversized seal; that is to say they rotate in a new seal whose center hole is larger than that of the original seal in order to accommodate the increased diameter of the speedy-sleeve mounted on the crankshaft. In time, however, say at 110,000 miles, these speedy sleeves also begin to leak. At this point the engine is often overhauled and the seals are replaced. Replacing worn seals with either speedy sleeves or with new seals involves economic costs far beyond the costs of the seals themselves. By far the largest costs are those associated with the skilled labor needed to pull the engine and/or transmission and to replace the seals. For example, in the case of diesel powered buses the whole engine/transmission package must be pulled in order to replace a worn seal. This operation may take two to three man/days of a skilled mechanic's time.

This invention seeks to provide methods and apparatus whereby the expensive operation of pulling the engine/transmission package to replace a worn seal can be delayed without causing damage to the transmission. That is to say this invention is particularly concerned with saving the economic cost of the first pulling of the engine/transmission package (e.g., at 80,000 miles in the case of a diesel engine/transmission package for a bus) so that the unit can continue to operate effectively until such time as a second pulling of the engine/transmission package (e.g., at an additional 30,000 miles, that is to say at 110,000 miles) is normally scheduled and at a point in the engine's life when replacements and repairs, other than replacement of seals, also may be required as part of the overall maintenance schedule for the vehicle.

SUMMARY OF THE INVENTION

The device of this patent disclosure serves to collect automotive engine oil leaking from a crankcase seal located in a gear train housing which normally partitions an automotive transmission, located on the transmission side of the gear train housing, from an engine crankcase oil pan, located on the crankcase side of said housing, so that transmission fluid residing in the transmission side of the housing is not contaminated by engine oil leaking from a worn crankcase seal. In its most general embodiment, the device comprises a plate-like housing having: (1) a circular hole for permitting free rotation of a crankshaft and/or flywheel which rotates in said circular hole; (2) a front surface having a plurality of holes for receiving means for mounting the device to the transmission side of the gear train housing; and (3) a rear surface having (a) a concave depression which serves to form a trough into which oil leaking from the crankcase seal pools and from which said oil drains from the transmission side of the gear train housing to the crankcase side of the housing via a hole located in the housing between the bottom of the crankcase seal and the bottom of the trough and (b) a rim surface which snugly abuts against the transmission side of the gear train housing when said device is mounted to the housing.

In some preferred embodiments of this device the holes for receiving the means for mounting the device to the housing are holes which pass through the rim surface of the housing and which are, most preferably, threaded to engage threaded bolts which ultimately engage threaded holes in the gear train housing. The device can be any geometrical shape or configuration (round, square, rectangular, elliptical, etc.), but a preferred configuration for the device and for the depression is an elliptical configuration whose long axis is the vertical axis when the device is mounted to the gear train housing. In the most preferred embodiments of this device, the center of the circular hole which encompasses the crankshaft (or which encompasses a flywheel which extends from the crankshaft) is offset from the center point of the long axis of an elliptically configured depression.

DESCRIPTION OF THE PREFERRED EMBODIMENTS

Figure 1:
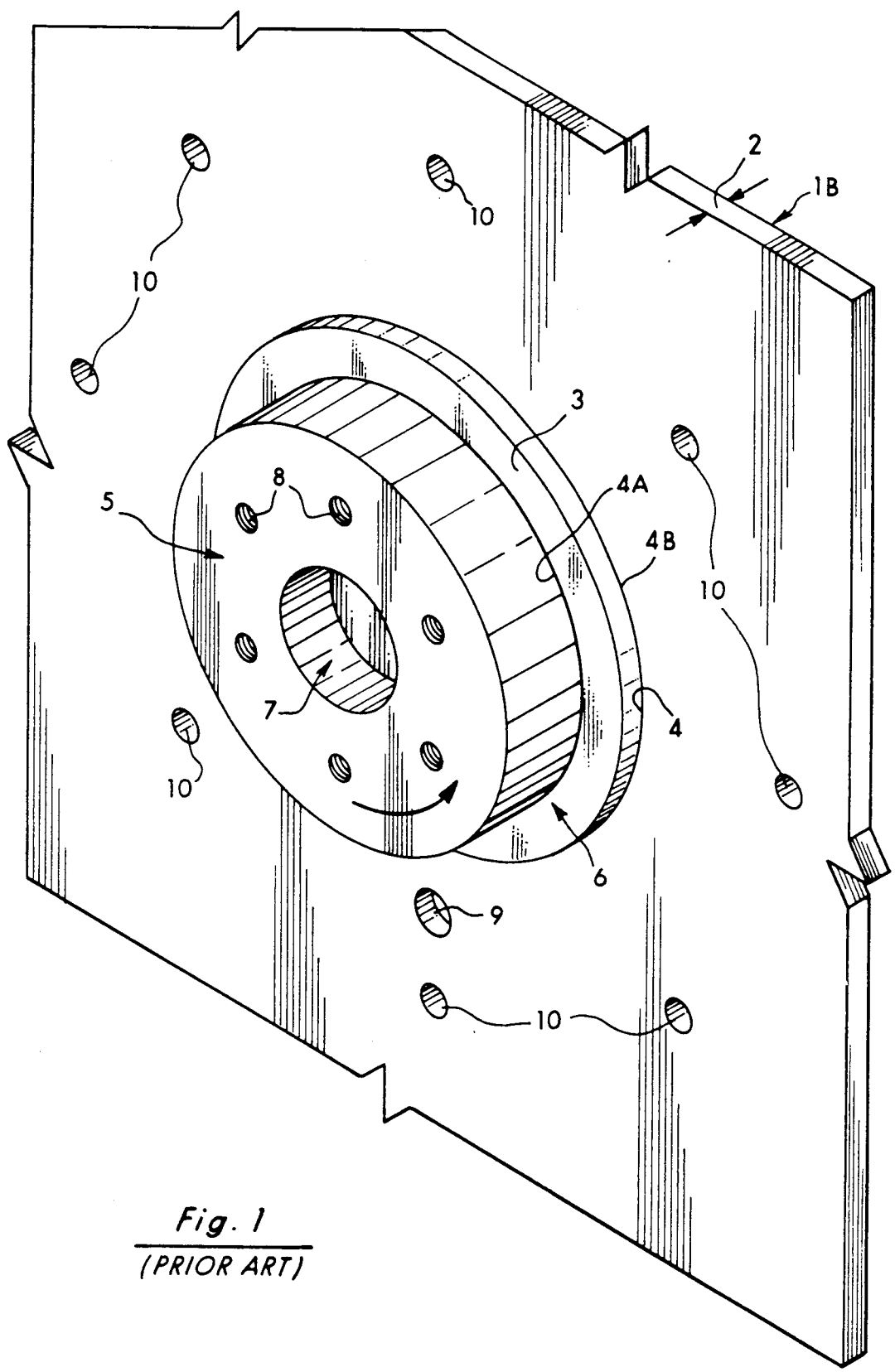
FIG. 1 is a perspective view of a prior art gear train housing containing a crankcase seal in which a crankshaft is journaled and upon which the oil collecting device of this patent disclosure is mounted.

FIG. 1 shows a gear train housing 1 having a front face 1A and a rear face 1B and a thickness 2. The gear train housing 1 is used as a partition between an automotive transmission (not shown) and an automotive engine crankcase (not shown). The front face 1A of gear train housing 1 faces the transmission and the rear face 1B faces the engine crankcase. Crankshaft seal 3 is mounted in a circular opening 4 in the housing 1. The crankshaft seal 3 has a hole 4A which encompasses a crankshaft 5 in a sealed, journaled fitting such that crankshaft 5 can rotate in crankshaft seal 3 without leaking crankcase oil as the engine rotates the crankshaft 5. In many cases a flywheel (not shown) is the first device directly connected to the crankshaft 5. Usually this connection is by means of (a) a flywheel shaft (not shown) which is inserted into a receiver hole 7 in the crankshaft 5 and (b) a series of threaded holes 8 on the crankshaft 5 which receive bolts attached to a flanged fitting on the flywheel shaft in the manner generally depicted in FIG. 4 and (c) a circular lip having a diameter slightly larger than the diameter D of the face of the crankshaft 5 and hence which overhangs the face 5B of the crankshaft. An oil drain hole 9, which extends through the entire thickness 2 of gear train housing 1, serves to drain oil from the transmission side 1A of the housing 1 to the engine crankcase side 1B and then into the engine's crankcase oil pan (not shown). A series of mounting holes 10 are located around the crankshaft seal 3 to mount the oil collection device of this patent disclosure to the gear train housing 1. These mounting holes 10 may or may not extend through the entire thickness 2 of the housing 1.

Figure 2:
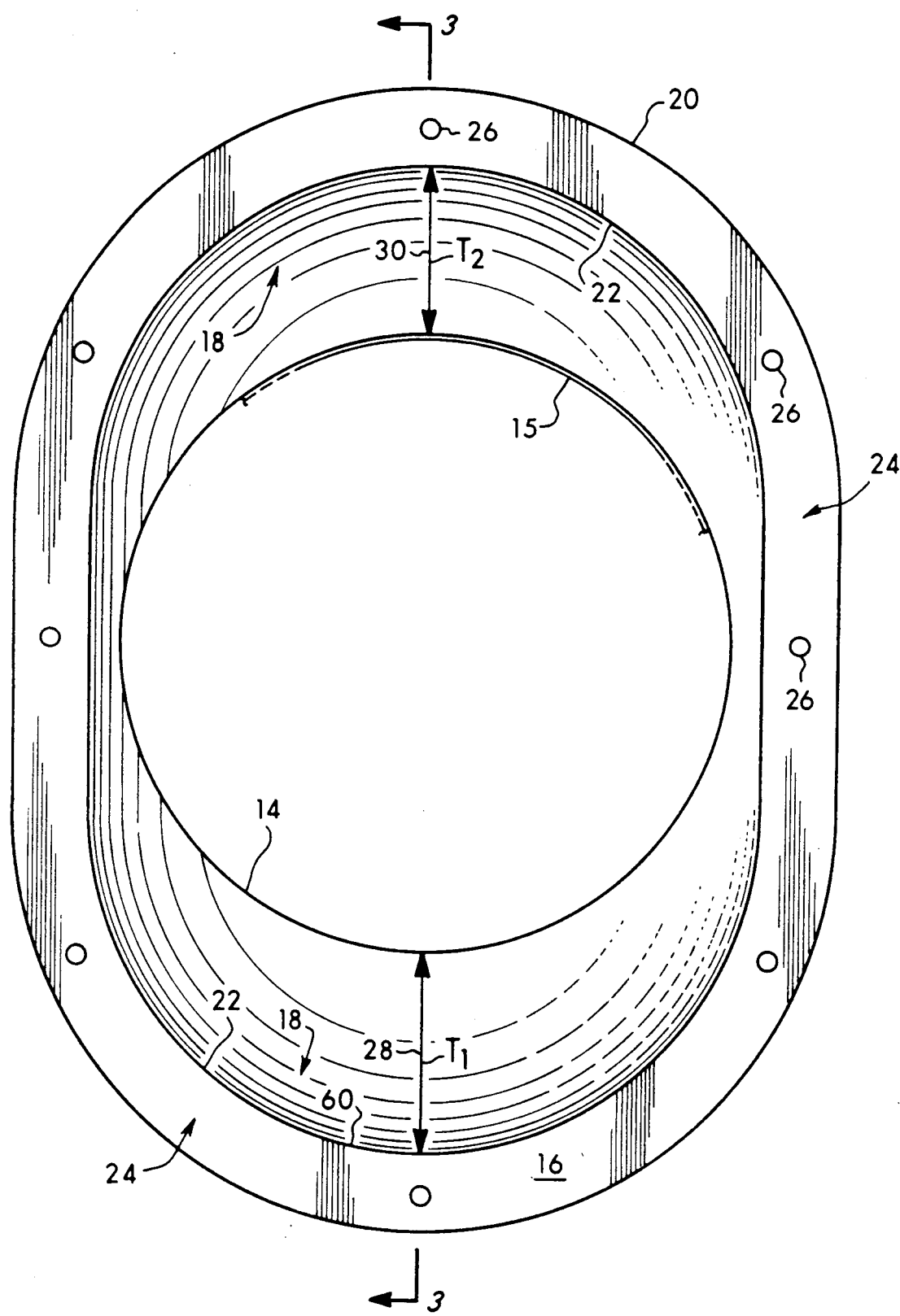
FIG. 2 is a rear view of the herein disclosed device for collecting automotive oil leaking from a crankcase seal into an automotive transmission.

FIG. 2 is a rear view of an oil collection device 12 made according to this patent disclosure. The oil collection device 12 has a plate-like configuration. However, it also has a circular hole 14 extending through the entire device 12. This hole 14 permits free rotation of a shaft such as the flywheel shaft shown in FIG. 4 as item 46. That is to say the diameter $D_2$ of the hole 14 must be sufficient to accommodate the free rotation of a shaft (e.g., the crankcase shaft or the flywheel shaft) which rotates in the hole 14. Nonetheless, the diameter of hole 14 should only be slightly larger than the diameter of the shaft in order to minimize fluid contamination in this region. This circular hole 14 may also be provided with a seal 15 which serves to prevent contact between the transmission fluid and the oil. However, such a seal 15 is not necessary to the proper functioning of the device if the hole 14 and crankshaft 5 are built to close tolerances.

Figure 4:
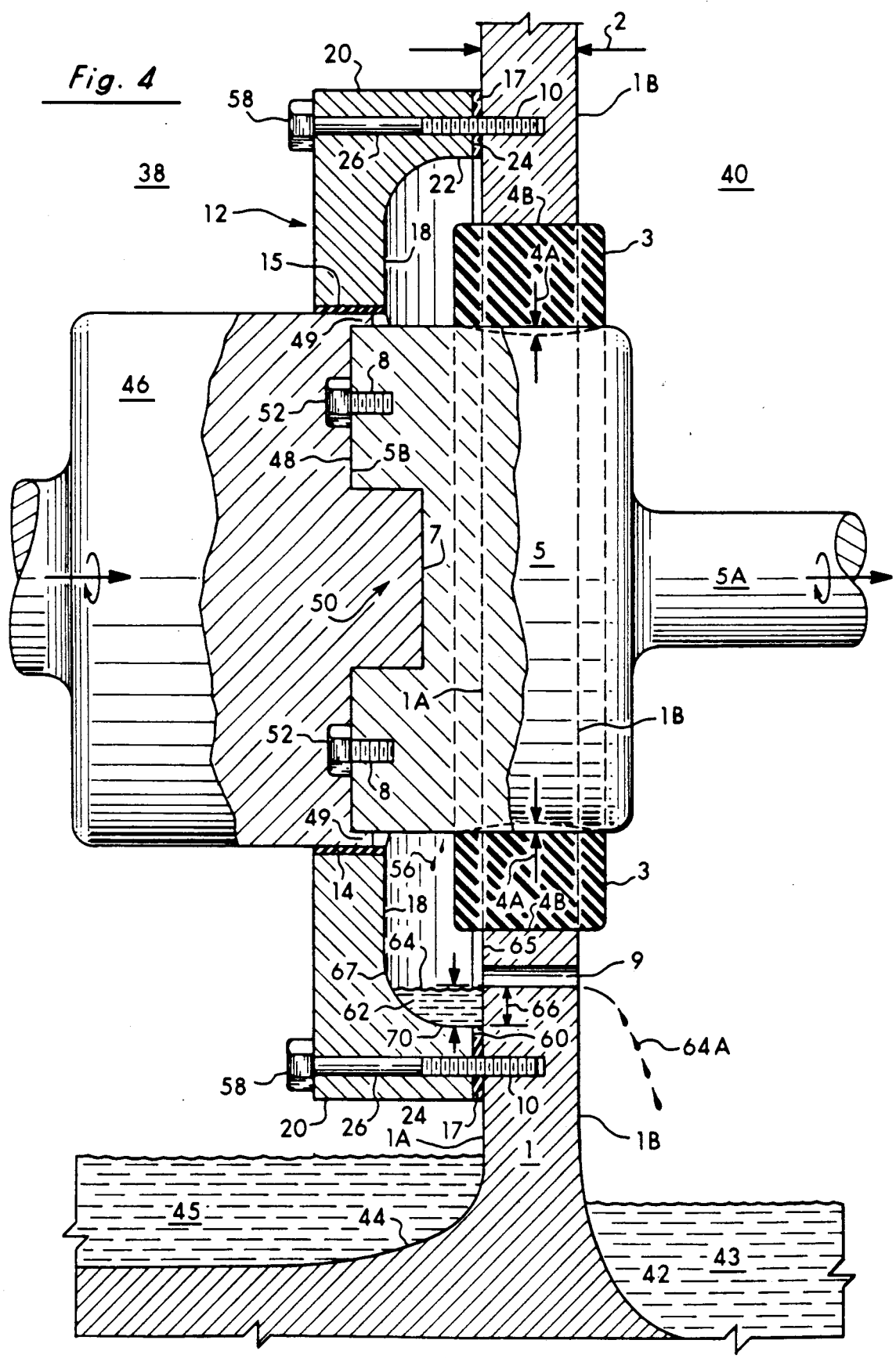
FIG. 4 depicts the oil collection device mounted on a gear train housing and performing its oil collection and return function with respect to an originally installed (or newly installed) crankshaft seal.

The rear surface 16 of the device 12 is provided with a concave depression 18 which, when the device 12 is mounted to the housing 1, serves to help form (in conjunction with the housing 1) a reservoir for catching oil leaking from the crankcase seal in the manner generally depicted in FIG. 4. The outside contour 20 of the oil collecting device 12 and the outside contour 22 of depression 18 define a rim surface 24 which abuts against the transmission side of the gear train housing when the device 12 is vertically positioned on the housing to perform its oil collecting function. Optional seals 17 that aid in the prevention of leaks between the rim 24 and the housing 1 may also be employed. If employed such seals would preferably have a configuration which generally conforms to the configuration of the rim 24.

Again, the device 12 can have any configuration, e.g., round, elliptical, rectangular, etc., but in a preferred embodiment of this invention the plate-like oil collecting device has an elliptical configuration. In such case the depression 18 most preferably will have a concentric elliptical configuration which defines the inside edge of a rim surface which also has an elliptical configuration.

In the preferred embodiments of the device 12, the rim surface 24 has a series of holes 26 (preferably threaded holes) which receive means for attaching the device 12 to the gear train housing 1. Preferably such means are threaded bolts which pass through the device 12 and threadedly engage appropriately spaced threaded holes in the gear train housing 1 such as those holes designated as items 10 in FIG. 1. In one preferred embodiment of this device, the circular hole 14 is not located at the center C of the long axis A—A' of an elliptically configured device, but rather is offset along axis A—A', a distance $D_3$ from the center C of the long axis A—A'. This feature creates a first trough region $T_1$ having a generally parabolically shaped contour whose depth 28 is different from (here less than) a second parabolically shaped trough region $T_2$ having a depth 30. Thus the device could be mounted with the $T_1$ trough region at the top of the mounted device or at the bottom and thus have a trough of differing depth (depth 28 or 30) at the bottom. FIG. 2 also gives some representative dimensions of the various features of the device which are particularly suited for oil collecting devices which are especially adapted for use on gear train housings on many buses of the type commonly used by public transportation systems. These dimensions should not however be taken as limitations on the scope of this invention.

Figure 3:
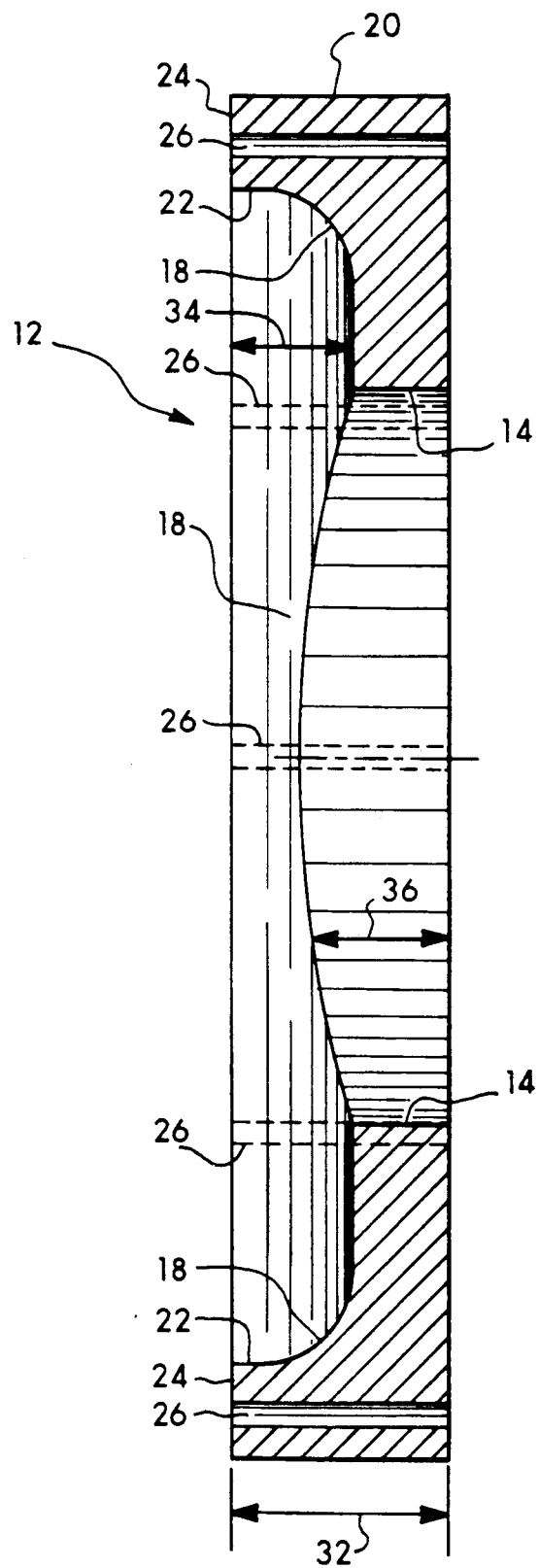
FIG. 3 is a cut-away side view of the oil collection device.

FIG. 3 is a side view of the oil catching device 12 depicted in FIG. 2. In addition to the information given in FIG. 2, FIG. 3 shows that (1) the overall device 1 has a thickness 32, (2) the concave depression 18 has a depth 34, and (3) the concave hole 14 itself has a depth 36. Most preferably the thickness 32 should not be greater than about two inches. In one particularly preferred version of this device which is adapted for use on diesel powered buses, the thickness 32 is about one-half inch and the depth 34 of the depression 18 is about three-eights of an inch so that the depth 36 of hole 14 is about one-eighth of an inch.

FIG. 4 depicts the oil collection device 12 of this patent disclosure mounted in its intended operating position on the gear train housing 1. As previously noted, the engine can be either a diesel type engine or a gasoline type engine, for any type vehicle, e.g., bus, truck, construction work vehicle, automobile, etc., as these kinds of distinctions are not material to this invention. That is to say that with either type of engine or any type vehicle, a gear train housing 1 serves to partition and segregate the engine's crankcase oil pan 42 and its pool of oil 43 from the transmission fluid container 44 and its pool of transmission fluid 45. In any event, a gear train housing 1 has its left side 1A facing toward a transmission side 38 and its right side 1B facing toward an engine crankcase side 40 of said housing. The housing 1 has a hole 4 into which a crankcase seal 3 is compression fitted. The crankcase seal 3 of FIG. 4 is an "original" or new one as opposed to the enlarged, speedy-sleeve accommodating seal 3A shown in FIG. 5. The crankcase seal 3 in turn has a hole 4A which encompasses crank-shaft 5 in a journal type fitting so that crankshaft 5 can rotate in crankshaft seal 3 under torque delivered by an engine (not shown) without leaking oil, at least while the seal 3 is "new". Again, in the case of diesel powered buses, this seal wears out and/or wears a depression 4B in the crankshaft 5 after about 80,000 miles of service. The crankshaft 5 is mounted in the crankcase seal 3 and terminates beyond the crankcase seal 3, on the engine crankcase side 40 of the gear train housing 1, in a shaft 5A which is ultimately coupled to the engine. The other end of crankshaft 5 terminates in a flange-like surface 5B of the type shown in FIG. 1 which is coupled to a transmission (not shown), usually via a flywheel 46 having a mating flange-like front face 48 which abuts against the flange-like surface 5B of the crankshaft 5. In one common arrangement the flange-like front face 48 of the flywheel 46 has a lip 49 which overhangs and encompasses the front face 5B of the crankshaft 5. Thus the hole 14 in the oil collecting device 12 must be of sufficient diameter $D_2$ to accommodate free rotation of the lip 49 of the flywheel 46. For the purposes of this patent disclosure the crankshaft and/or the flywheel may extend through the device or they may be coupled in the device (e.g. in the hole 14 or in the hollowed out depression 18) and hence the terms "crankshaft", "flywheel" and "crankshaft/flywheel" should all be taken to include any and all of these possibilities. The flywheel is also provided with a shaft 50 which projects into the receiver hole 7 of crankshaft 5. The flywheel 46 and the crankshaft 5 are preferably held in their flange fitted relationship by means of bolts 52 which are threaded into holes 8 in the flange-like surface 5B of crankshaft 5. Again, the crankshaft 5 rotates in the crankshaft seal 3 along surface 4A. This surface 4A eventually wears down to such an extent that oil leaks begin to take place, particularly in the region generally designated by arrow 54 on the transmission side 38 of the gear train housing 1.

The depression 4C in the crankcase is generally intended to depict a wearing in the crankshaft 5 and/or the seal 3 which encompasses it. In either case, engine oil leaks and forms oil drops 56 which, if not dealt with, would fall into and contaminate the pool of tranmission fluid 45. Hence, the main purpose of the oil collection device 12 of this patent disclosure is to collect those oil drops or runs 56 leaking from crankshaft seal 3 and to return that oil to the engine crankcase side 40 of the gear train housing 1 before the oil can contaminate the transmission fluid 45. The oil collecting device 12 comprises a plate-like housing having a circular hole 14 which permits free rotation of the crankshaft 5 and/or the flywheel 46 (including its lip 49 if it is present) coupled to the crankshaft 5. Again this hole may optionally be provided with a seal 15 which serves to prevent fluid leakage as the flywheel 46 rotates in hole 14. The bottom of rim surface 24 of the oil collecting device 12 abuts against the transmission side 1A of gear train housing 1 in a liquid sealing relationship. Optionally, seals 17 may be employed on the rim surface 24 between the device 12 and the left or 1A side of housing 1 to prevent leakage of oil out of the device 12 or leakage of transmission fluid 45 into said device 12.

The device 12 also is provided with a series of holes 26 which correspond to the holes 10 in the gear train housing 1 shown in FIG. 1. Mounting means such as threaded bolts 58 which extend through holes 26 in the device 12 and which anchor in holes 10 in the gear train housing 1 may be conveniently employed for this purpose. Preferably the inside edge 60 of rim 24 is mounted beyond the outside edge 4B of the crankshaft seal 3 a sufficient distance to allow the formation of a trough (or reservoir) region $T_1$ below the bottom of seal 3 (which "bottom" also is generally designated by the line designated as item 4B). The rear surface 24 of the device 12 is provided with a concave depression 18 which, when the device 12 is mounted to housing 1 forms the rear and bottom sides 67 (the housing 1 forms the front side 65) of trough 61 which serves as a "reservoir" for oil drops 56 leaking from the worn region 4B between crankshaft seal 3 and the crankshaft 5. An oil reservoir 62 eventually builds up as the seal 3 continues to leak oil. This oil reservoir 62 eventually rises to a level such that the oil drains through a hole 9 in the gear train housing 1. That is to say the top level 64 of the oil reservoir 62 finally reaches the bottom level 9A of the hole 9. Thus, oil 64A goes through hole 9 and, in effect, drains from the oil reservoir 62 into the oil 43 of the crankcase oil pan 42. This draining action serves to prevent any oil drops 56 leaking from the crankcase seal 3 from ever coming into contact with the transmission fluid 45. Most preferably this reservoir should not be permitted to reach a height 66 of more than about 1/16 inch above the bottom 70 of the reservoir before it reaches the height 9A of the bottom of hole 9 at which the oil drains over to the crankcase side 40. Heights 66 less than 1/16 inch, e.g., 1/32 inch are even more preferred. Most preferably the hole 9 should have a diameter of at least about 7/16 inch. Those skilled in this art will appreciate that in a correctly functioning engine there is no more pressure on the crankcase side of the housing than on the transmission side.

Figure 5:
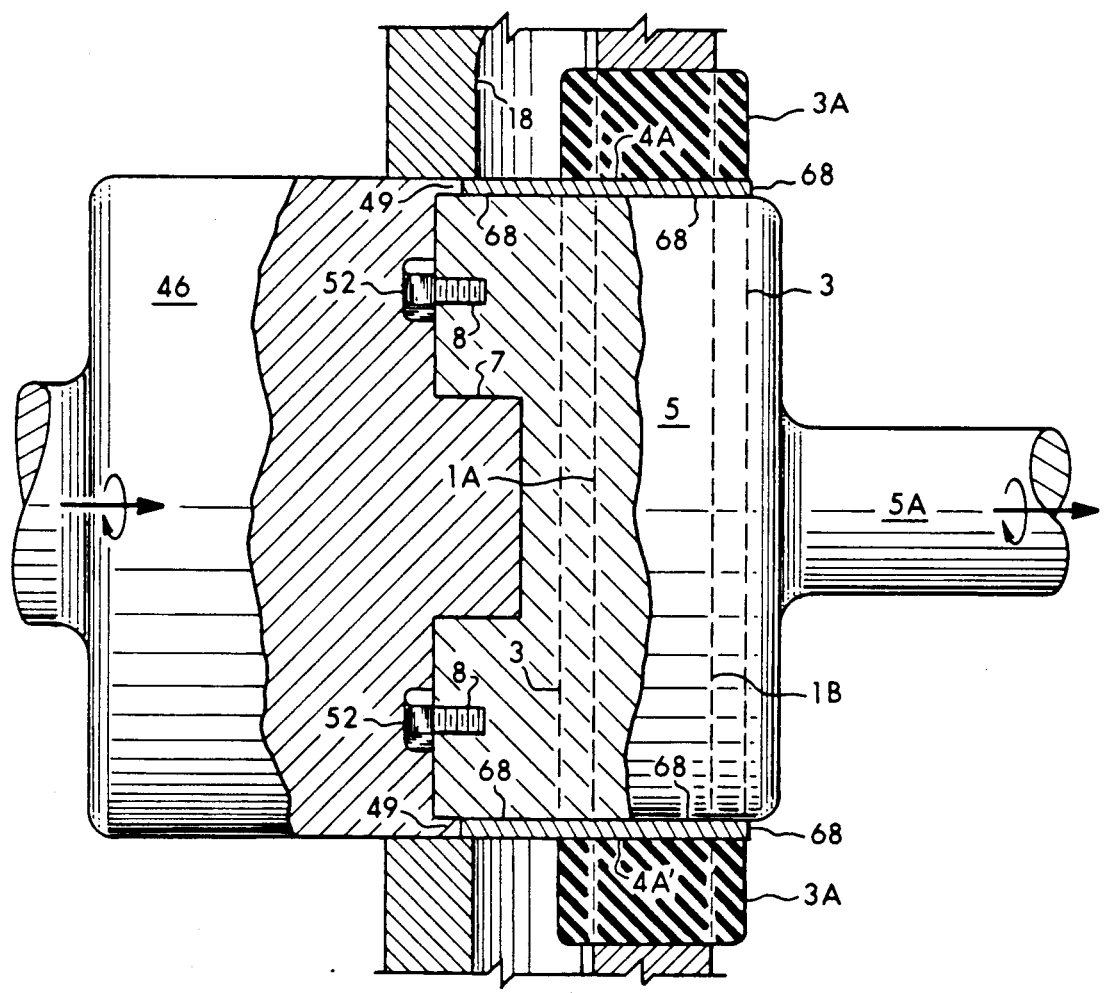
FIG. 5 depicts the device performing its oil collection function in the case where an original crankcase seal is replaced with a crankcase seal having an enlarged center hole to accommodate a crankshaft which is fitted with a speedy-sleeve.

FIG. 5 depicts a crankshaft 5 provided with a so-called speedy-sleeve 68 which is fitted to said crankshaft 5. Such speedy-sleeves 68 are typically installed on the crankshaft 5 of diesel buses after about 80,000 miles of service in order to deal with the wear depicted as worn region 4C in FIG. 4. In order to accommodate the presence of speedy-sleeve 68 a different crankshaft seal 3A must replace the seal 3 shown in FIG. 4. That is to say that the diameter 4A' of seal 3A must be greater than the diameter 4A of seal 3 shown in FIG. 4.

As was previously noted such speedy-sleeves 68 are installed in buses at about 80,000 miles of service and they are intended to prevent leaks for another 30,000 miles or so of service, i.e., (until about 110,000 miles total service) and at which point the engine/transmission system needs other scheduled maintenance, repairs and replacements which require the pulling of the engine/transmission system. Thus the oil collecting device 12 of this patent disclosure could be mounted on the housing 1 when the vehicle is a brand new part of the original assembly process or at any other time in its useful life when the engine and/or transmission is pulled (separated from the remainder of the vehicle). Thus, if the device were originally mounted it could operate in the interim between 80,000 and 110,000 miles and thus save the expense of pulling the engine and installing speedy-sleeves at 80,000 miles. It could also save the expense of pulling the engine/transmission system before 80,000 miles in the event of unusually heavy wear. Similarly, if the oil collecting device 12 were installed at 80,000 miles when the speedy-sleeves are placed in service, the device could serve as a back-up system to the speedy-sleeve system in case it leaked oil before its otherwise scheduled replacement at say 110,000 miles.

While certain preferred embodiments of this apparatus are described above, it should be appreciated that they are given by way of illustration only. They are not intended as limitations since this patent disclosure is intended to cover all modifications, alternatives and equivalents falling within the scope and spirit of this invention as expressed in the appended claims. Thus, for example, even though this invention used oil collectors having an elliptical configuration as its primary example, oil collectors having other outside edge and depression configurations, e.g., circular, rectangular, etc. are also contemplated as being within this patent disclosure. Similarly, the fact that the examples were largely developed around the maintenance schedules of diesel powered buses should not be regarded as a limitation since the teachings of this invention apply to other types of engines and/or to other types of vehicles having a need to keep one type of fluid from contaminating another.

Thus having disclosed my invention, I claim:

1. A device for collecting automotive engine oil leaking from a crankshaft seal located in a gear train housing which serves to partition an automotive transmission located on a transmission side of the gear train housing from an engine crankcase oil pan located on a crankcase side of said housing so that transmission fluid residing in the transmission side of the housing is not contaminated by the leaking engine oil, wherein said device comprises a plate-like housing having:

(1) a circular hole for permitting free rotation of a crankshaft/flywheel which extends into said hole;
   (2) a front surface having a plurality of holes for receiving means for mounting the device to the transmission side of the gear train housing; and
   (3) a rear surface having (a) a concave depression which serves to form a bottom of a trough into which oil leaking from the crankcase seal collects and drains directly from the transmission side of the gear train housing to the crankcase side of the housing without being further retained via a hole located in the gear train housing between the crankcase seal and the bottom of the trough and (b) a rim surface which abuts against the transmission side of the gear train housing when said device is mounted to the gear train housing.

2. The device of claim 1 wherein the holes for receiving the means for mounting the device to the gear train housing are holes which pass through the rim surface of the housing.

3. The device of claim 1 wherein the holes for receiving the means for mounting the device to the gear train housing are threaded holes which engage threaded bolts which engage threaded holes in the gear train housing.

4. The device of claim 1 wherein the configuration of the depression is an elliptical configuration having a vertical axis and the center of the circular hole for permitting free rotation of the crankshaft is offset from a center point of a vertical axis of said elliptical configuration.

5. The device of claim 4 wherein the elliptical configuration is offset from a center point of the ellipse such that troughs created at both ends of the ellipse have two different depths with respect to the circular hole that passes through the housing.

6. The device of claim 5 wherein the platelike housing having the elliptical configuration can be mounted in the inverted position such that a trough of a differing depth would be positioned directly adjacent to the circular hole in the housing.

7. The device of claim 1 wherein a distance to the bottom of the hole in the gear train housing for draining the oil from the transmission side to the crankcase side is no more than about 1/16 inch from the bottom of the trough in which the leaked oil is collected.

8. The device of claim 1 which further comprises a seal for the rim surface and another seal for the circular hole which permits free rotation of the crankshaft.

9. A device for collecting automotive engine oil leaking from a crankcase seal located in a gear train housing of a diesel powered bus which seal serves to partition an automotive transmission located on a transmission side of the gear train housing from an engine crankcase oil pan located on a crankcase side of said housing so that transmission fluid residing in the transmission side of the housing is not contaminated by the leaking engine oil, wherein said device comprises a plate-like housing having:

(1) a circular hole for permitting free rotation of a flywheel which extends into said hole;
(2) a front surface having a plurality of holes for receiving means for mounting the device to the transmission side of the gear train housing; and
(3) a rear surface having (a) a concave depression which serves to form a bottom of a trough into which oil leaking from the crankcase seal collects and drains directly from the transmission side of the gear train housing to the crankcase side of the housing without being further retained via a hole located in the gear train housing between the crankcase seal and the bottom of the trough and (b) a rim surface which abuts against the transmission side of the gear train housing when said device is mounted to the gear train housing.

10. The device of claim 9 wherein the configuration of the depression is an elliptical configuration having a vertical axis and the center of the circular hole for permitting free rotation of the crankshaft is offset from a center point of the vertical axis of said elliptical configuration.

11. The device of claim 10 wherein the elliptical configuration is offset from a center point of the ellipse such that troughs created at both ends of the ellipse have two different depths with respect to the circular hole that passes through the housing.

12. The device of claim 11 wherein the platelike housing having the elliptical configuration can be mounted in the inverted position such that a trough of a differing depth would be positioned directly adjacent to the circular hole in the housing.

13. The device of claim 9 wherein the holes for receiving the means for mounting the device to the gear train housing are holes which pass through the rim surface of the housing.

14. The device of claim 9 wherein the holes for receiving the means for mounting the device to the gear train housing are threaded holes which engage threaded bolts which engage threaded holes in the gear train housing of the diesel powered bus.

15. The device of claim 9 wherein a distance to the bottom of the hole in the gear train housing for draining the oil from the transmission side to the crankcase side is no more than about 1/16 inch from the bottom of the trough in which the leaked oil is collected.

16. The device of claim 9 which further comprises a seal for the rim surface and another seal for the circular hole which permits free rotation of the flywheel.

17. A method for collecting automotive engine oil leaking from a crankcase seal located in a gear train housing which serves to partition an automotive transmission located on a transmission side of the gear train housing from an engine crankcase oil pan located on a crankcase side of said housing so that transmission fluid residing in the transmission side of the housing is not contaminated by the leaking engine oil, wherein said method comprises:

(1) providing the gear train housing with a plate-like device having a circular hole for permitting free rotation of a crankshaft/flywheel which projects through the circular hole;
(2) providing the plate-like housing with a front surface having a plurality of holes for receiving means for mounting the device to the transmission side of the gear train housing;
(3) providing the plate-like housing with a rear surface having (a) a concave depression which serves to form a bottom of a trough into which oil leaking from the crankcase seal (pools) collects and drains directly from the transmission side of the gear train housing to the crankcase side of the housing without being further retained via a hole located in said gear train housing between (the bottom of) the crankcase seal and the bottom of the trough and (b) a rim surface for abutting against the transmission side of the gear train housing when said device is mounted to the gear train housing; and
(4) providing a hole in the gear train housing between the bottom of the trough and the bottom of the seal to allow oil to drain from the transmission side of the housing to the crankcase side of the housing.

18. The method of claim 17 which further comprises providing the housing with bolt receiving holes passing through the rim surface of said housing.

19. The method of claim 17 which further comprises providing the housing with threaded holes passing through the rim surface of said housing.

20. The method of claim 17 wherein a distance to the bottom of the hole in the gear train housing for draining the oil from the transmission side to the crankcase side is positioned no more than about 1/16 inch from the bottom of the trough in which the leaked oil is collected.

21. The method of claim 17 wherein the configuration of the depression is made with an elliptical configuration with a vertical axis and the center of the circular hole for permitting free rotation of the crankshaft is offset from a center point of the vertical axis of said elliptical configuration.

22. The method of claim 21 wherein the elliptical configuration is offset from a center point of the ellipse such that troughs created at both ends of the ellipse have two different depths with respect to the circular hole that passes through the housing.

23. The method of claim 21 wherein the plate-like housing having the elliptical configuration can be mounted in the inverted position such that a trough of a differing depth would be positioned directly adjacent to the circular hole in the housing.

* * * * *